Jan. 13, 1925.
W. STEVENSON
NUT LOCK
Filed Oct. 20, 1922
1,523,146
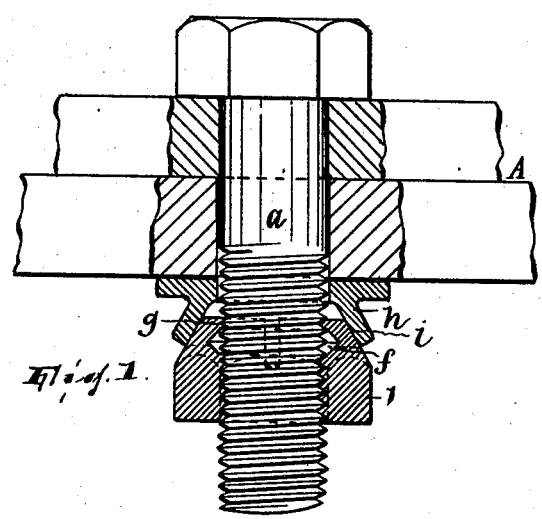
Fig. 1.
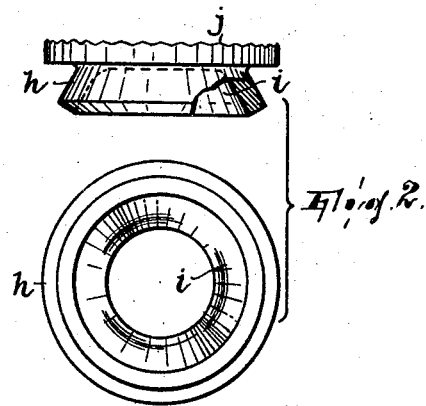
Fig. 2.
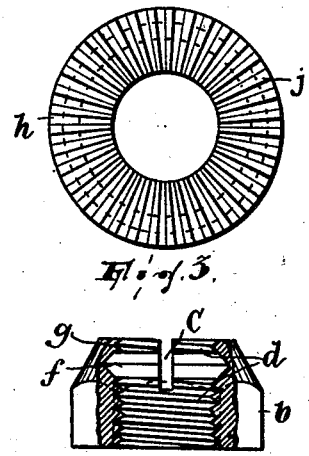
Fig. 3.
Fig. 4.
WITNESS
Wm. L. Bell
INVENTOR,
William Stevenson,
BY
ATTORNEY.

Patented Jan. 13, 1925.

1,523,146

UNITED STATES PATENT OFFICE.

WILLIAM STEVENSON, OF MORRISTOWN, NEW JERSEY.

NUT LOCK.

Application filed October 20, 1922. Serial No. 595,783.

*To all whom it may concern:*

Be it known that I, WILLIAM STEVENSON, a citizen of the United States, residing at Morristown, in the county of Morris and State of New Jersey, have invented certain new and useful Improvements in Nut Locks, of which the following is a specification.

This invention relates to the locking of nuts on bolts and the like and it has reference to nut locking means in particular in which the nut has a cross-split and its thus split portion is adapted, as by a member with which it coacts wedge-fashion, to be contracted into gripping relation to the bolt or other threaded element onto which it is screwed. The object of the invention is to construct the nut with portions which will obtain a definite and secure grip on the threading of the bolt or other threaded element on which the nut is screwed which will insure against the nut loosening thereon.

In the drawing, in which the invention is fully illustrated,

Fig. 1 shows a bolt in side elevation and the nut and member coactive therewith, and also certain parts A to be held clamped together, in section;

Fig. 2 shows a side elevation, partly in section, and an underneath plan of said member;

Fig. 3 is a top plan view of the said member; and

Fig. 4 is a sectional view of the nut.

Let $a$ designate a bolt or other threaded element penetrating and having its head abutting one of two pieces A to be clamped together.

$b$ is the nut. It is preferably formed conical at one end, and at said end it has a transverse split $c$ permitting the portions both sides of such split to be forced together to a more or less extent. The nut is threaded, as at $d$, in the usual way to fit the threading of the bolt $a$, but in a transverse plane at right angles to its axis and intersecting the split nut has an internal circumferential groove $f$, so that the threading $d$ is interrupted. This leaves at each side of the split a circumferential bearing or gripping jaw $g$.

Adapted to coact wedge-fashion with the conical end of the nut is the member $h$ which in effect is a washer of any suitable form but having a conical seat $i$ adapted to receive the conical end of the nut. The opposite face of member $h$ may be serrated or roughened, as shown in Figs. 2 and 3. The depth of this member is preferably such that when the member receives in its conical seat $i$ the conical end of the nut and pressure is applied to force the latter wedge-fashion into the former only the split portion of the nut will be subjected to the contracting influence of said member, whereby there will be a bending inward more or less, of the parts of the nut separated by the split and, the nut and member being on the bolt, the bearing or gripping jaws $g$ of the nut will be forced into gripping contact with the bolt. On account of the groove $f$ the parts of the nut affected yield more readily to the contracting influence than they otherwise would, and this yielding if as shown the groove traverses the splits themselves as well as the planes in which they lie further permits the threaded bearing or gripping portions $g$ to assume a more perfect face to face or mating contact with the threaded surface of the bolt than would otherwise be possible, besides reducing the acting or gripping surfaces of said portions so that they are better adapted to bite into the said threaded surfaces.

In use member $h$ is arranged to bear against some fixed surface, as of one of the pieces A to be clamped together, and then the nut is screwed up against the same so as to cause them to coact wedge-fashion. In this the jaws $g$ will be caused to shift radially to firmly grip the threaded part of the bolt so that the nut will be locked securely against turning as an incident of vibration, although it may be loosened of course with a wrench. If the member $h$ is serrated or roughened at $j$ a further interlock will be set up between it and the surface against which it bears which will increase the resistance of the nut to loosening.

In any case in which a nut has been heretofore split crosswise so that the split part can be by wedge-action contracted into clamping relation to the bolt or equivalent there has been no groove, such as the groove $f$ herein referred to, to modify the bending action of the portions separated by the split, in consequence of which in order to cause the nut to grip the bolt it had to be distorted or strained to a degree likely to injure the nut, and in addition the grip attained was unreliable and uncertain; by grooving the nut at $f$, according to my invention, the said portions are rendered more yielding and in addition jaws g. inwardly projecting and therefore adapted to obtain a certain or secure grip on the bolt, are produced. I preferably groove the nut to form the jaws so that the latter will each extend from split to split, whereby the jaws are stronger and of sufficient extent so that they will not mutilate the bolt threading.

In the example illustrated the nut is interiorly threaded and is adapted to be fitted to an exteriorly threaded element, as an ordinary bolt a. But my invention is not limited to a nut of this particular type.

Having thus fully described my invention, what I claim and desire to secure by Letters Patent is:—

In combination, a threaded element, a threaded nut provided with a crosswise split and a circumferential groove at one end, and a member co-active with the split end portion of the nut to contract the same, the crosswise split of the said nut extending substantially below the said groove thereby causing the nut to be held rigidly in engagement with said element.

In testimony whereof I affix my signature.

WILLIAM STEVENSON.